US008913687B1

(12) United States Patent
Huang et al.

(10) Patent No.: US 8,913,687 B1
(45) Date of Patent: Dec. 16, 2014

(54) SIGNAL TRANSMISSION SYSTEM AND SIGNAL TRANSMISSION CIRCUIT

(71) Applicant: I-Shou University, Kaohsiung (TW)

(72) Inventors: Chun-Wei Huang, Kaohsiung (TW);
Yu-Jung Huang, Kaohsiung (TW);
Ming-Kun Chen, Kaohsiung (TW)

(73) Assignee: I-Shou University, Kaohsiung (TW)

( * ) Notice: Subject to any disclaimer, the term of this patent is extended or adjusted under 35 U.S.C. 154(b) by 0 days.

(21) Appl. No.: 14/053,612

(22) Filed: Oct. 15, 2013

(30) Foreign Application Priority Data

Jul. 4, 2013 (TW) .............................. 102124050 A

(51) Int. Cl.
*H04L 27/00* (2006.01)
*H04B 5/00* (2006.01)

(52) U.S. Cl.
CPC ............ *H04B 5/0075* (2013.01); *H04B 5/0031* (2013.01)
USPC ........................................................ 375/295

(58) Field of Classification Search
CPC ........................... H04B 5/0075; H04B 5/0031
USPC ........................................................ 375/295
See application file for complete search history.

(56) References Cited

U.S. PATENT DOCUMENTS

| 5,070,500 | A | * | 12/1991 | Horinouchi et al. | ...... | 365/189.02 |
| 5,701,037 | A | * | 12/1997 | Weber et al. | ................... | 257/777 |
| 6,310,561 | B1 | * | 10/2001 | Nomura et al. | ............... | 340/905 |
| 7,460,604 | B2 | * | 12/2008 | Dupuis | ......................... | 375/258 |
| 2005/0077546 | A1 | * | 4/2005 | Neaves | .......................... | 257/210 |
| 2006/0181301 | A1 | | 8/2006 | Neaves et al. | | |
| 2009/0233546 | A1 | * | 9/2009 | Sasaki et al. | ................. | 455/41.1 |
| 2013/0006557 | A1 | | 1/2013 | Chakrabarty et al. | | |

FOREIGN PATENT DOCUMENTS

TW    201205756    2/2012

* cited by examiner

*Primary Examiner* — Juan A Torres
(74) *Attorney, Agent, or Firm* — Jianq Chyun IP Office

(57) ABSTRACT

A signal transmission system and a signal transmission circuit are provided. The system includes a first chip and a second chip. A rising pulse signal (RPS) and a falling pulse signal (FPS) are generated by a transmission module on the first chip in response to a waveform of an input signal. The RPS corresponds to rising edges of the input signal, the FPS corresponds to falling edges of the input signal, and the RPS and the FPS are transmitted by a first transmission unit and a second transmission unit both located on a surface of the first chip.

17 Claims, 4 Drawing Sheets

SIGNAL TRANSMISSION SYSTEM AND SIGNAL TRANSMISSION CIRCUIT

CROSS-REFERENCE TO RELATED APPLICATION

This application claims the priority benefits of Taiwan application serial no. 102124050, filed on Jul. 4, 2013. The entirety of the above-mentioned patent application is hereby incorporated by reference herein and made a part of this specification.

BACKGROUND OF THE INVENTION

1. Field of the Invention

The invention relates to an electronic circuit; more particularly, the invention relates to a signal transmission system and a signal transmission circuit.

2. Description of Related Art

With the miniaturization of electronic products and the reduction of relevant costs, IC chip miniaturization and three-dimensional stack packaging have become an important trend in the development of semiconductor technologies. In the existing three-dimensional ICs, signal transmission technologies (e.g., non-contact capacitive-coupling and inductive-coupling signal transmissions) have been more and more common.

Specifically, capacitive-coupling and inductive-coupling transmissions are achieved by way of alternating current (AC) coupled interconnection (ACCI), i.e., connection of direct current (DC) electrical components is not required in case of high-frequency transmission, and the signal transmission can be completed simply by a favorable communication link. The capacitive-coupling interconnection is a wireless inter-chip communication technology, whereby signals are transmitted from one chip to a neighboring chip. Moreover, the circuit design of the capacitive-coupling chip is rather simple and merely requires a small coupling area, and therefore the capacitive-coupling technology is suitable for integrating a plurality of chips.

However, as to ACCI, the circuit design of package plays a crucial role, and the circuits and the transmission method are related to the recovery accuracy of the transmitted signals. Thus, researchers skilled in the pertinent art are devoted to the study as how to ensure the I/O signal integrity during transmission and reception.

SUMMARY OF THE INVENTION

The invention is directed to a signal transmission system and a signal transmission circuit which may effectively improve signal integrity while the signals are transmitted between chips.

In an embodiment of the invention, a signal transmission system that includes a first chip and a second chip is provided. The first chip includes a transmission module, a first transmission unit, and a second transmission unit. The transmission module is configured to receive an input signal and generate a rising pulse signal and a falling pulse signal in response to a waveform of the input signal. The rising pulse signal corresponds to rising edges of the input signal, and the falling pulse signal corresponds to falling edges of the input signal. The first transmission unit is coupled to the transmission module and located on a surface of the first chip. Here, the first transmission unit is configured to transmit the rising pulse signal. The second transmission unit is coupled to the transmission module and located on the surface of the first chip. Here, the second transmission unit is configured to transmit the falling pulse signal. The second chip is configured opposite to the first chip. Besides, the second chip includes a first reception unit, a second reception unit, and a reception module. The first reception unit is located on a surface of the second chip and corresponds to the first transmission unit. Here, the first reception unit is configured to receive the rising pulse signal. The second reception unit is located on the surface of the second chip and corresponds to the second transmission unit. Here, the second reception unit is configured to receive the falling pulse signal. The reception module is coupled to the first reception unit and the second reception unit and configured to output a recovery signal according to the rising pulse signal and the falling pulse signal.

In another embodiment of the invention, a signal transmission circuit that is configured in a chip is provided, and the signal transmission circuit includes a transmission module, a first transmission unit, and a second transmission unit. The transmission module is configured to receive an input signal and generate a rising pulse signal and a falling pulse signal in response to a waveform of the input signal. The rising pulse signal corresponds to rising edges of the input signal, and the falling pulse signal corresponds to falling edges of the input signal. The first transmission unit is coupled to the transmission module and located on a surface of the first chip. Here, the first transmission unit is configured to transmit the rising pulse signal. The second transmission unit is coupled to the transmission module and located on the surface of the first chip. Here, the second transmission unit is configured to transmit the falling pulse signal.

As discussed above, in the signal transmission system and the signal transmission circuit described herein, the transmission module on the chip may generate the rising pulse signal and the falling pulse signal in response to the waveform of the input signal. The rising pulse signal corresponds to the rising edges of the input signal, the falling pulse signal corresponds to the falling edges of the input signal, and the rising pulse signal and the falling pulse signal are coupled to another chip in a wireless manner. Thereby, when the reception module on another chip receives the rising pulse signal and the falling pulse signal, the reception module is able to generate the recovery signal according to the received rising pulse signal and the received falling pulse signal, so as to effectively improve the integrity of signals transmitted between the chips.

In order to make the aforementioned and other features and advantages of the invention more comprehensible, embodiments accompanying figures are described in detail below.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the invention.

DETAILED DESCRIPTION OF DISCLOSED EMBODIMENTS

Generally, signals are continuously attenuated during wireless transmission; therefore, once a reception end receives the signals from a transmission end, the received signals are often required to be amplified. In case of amplifying signal intensities of two square waves, the pulse widths of the two square waves may be simultaneously expanded, such that the width or distance between the two square waves is reduced. Particularly, if the pulse widths of the two square waves are expanded to a certain extent, or the reduced width between the two square waves leads to the contact of the two square waves, the overlapped square waves may cause the amplified signals to be distorted significantly.

To resolve said issue, in the signal transmission system and the signal transmission circuit described herein, a to-be-transmitted signal is not directly transmitted from the transmission end to the reception end but divided into two signals with the narrow pulse width, wherein one of the two signals carries information of rising edges of the to-be-transmitted signal, and the other signal carries information of falling edges of the to-be-transmitted signal. After the reception end receives the two signals, the information of rising edges of the to-be-transmitted signal and the information of falling edges of the to-be-transmitted signal may be analyzed, so as to accurately reconstruct the to-be-transmitted signal.

Figure 1:
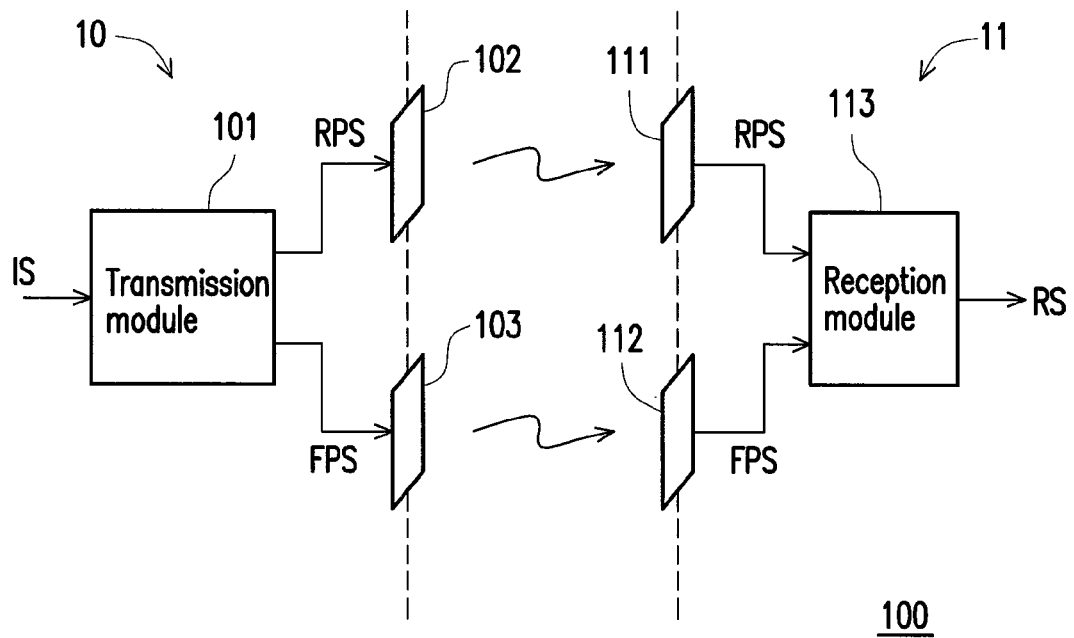
FIG. 1 is a schematic diagram illustrating a signal transmission system according to an embodiment of the invention.

FIG. 1 is a schematic diagram illustrating a signal transmission system according to an embodiment of the invention. With reference to FIG. 1, the signal transmission system 100 includes a chip 10 and a chip 11. The chip 10 includes a transmission module 101, a transmission unit 102, and a transmission unit 103. The transmission module 101 is configured to receive an input signal IS and generate a rising pulse signal RPS and a falling pulse signal FPS in response to a waveform of the input signal IS. The rising pulse signal RPS corresponds to rising edges of the input signal IS, and the falling pulse signal FPS corresponds to falling edges of the input signal IS.

The transmission unit 102 is coupled to the transmission module 101 and configured to transmit the rising pulse signal RPS. The transmission unit 103 is coupled to the transmission module 101 and configured to transmit the falling pulse signal FPS. In the present embodiment, the transmission units 102 and 103 are metal electrodes and may be configured on a surface of the chip 10 through electroplating or bonding, for instance. However, in another embodiment, the transmission units 102 and 103 may also be implemented in form of metal conductors or non-metal conductors.

The chip 11 is configured opposite to the chip 10. Besides, the chip 11 includes a reception unit 111, a reception unit 112, and a reception module 113. The reception unit 111 is configured to receive the rising pulse signal RPS from the transmission unit 102 of the chip 10, and the transmission unit 112 is configured to receive the falling pulse signal FPS from the reception unit 103 of the chip 10. In particular, if the chip 10 is configured opposite to the chip 11, e.g., the chips 10 and 11 are packaged in a three-dimensional manner or are stacked in a face-to-face manner, the transmission unit 102 is configured opposite to the reception unit 111, and the transmission unit 103 is configured opposite to the reception unit 112. The reception unit 111 may be wirelessly coupled to the transmission unit 102 to receive the signal from the transmission unit 102, and the reception unit 112 may also be wirelessly coupled to the transmission unit 103 to receive the signal from the transmission unit 103. Similar to the transmission units 102 and 103, the reception units 111 and 112 are metal electrodes and may be configured on the surface of the chip 11 through electroplating or bonding, for instance. However, in another embodiment, the reception units 111 and 112 may also be implemented in form of metal conductors or non-metal conductors.

The reception module 113 is coupled to the reception units 111 and 112 and configured to output a recovery signal RS according to the rising pulse signal RPS and the falling pulse signal FPS. That is, through the rising pulse signal RPS and the falling pulse signal FPS, the reception module 113 is able to obtain the rising-and-falling cycle and the pulse width of the original input signal IS and thereby generate the recovery signal RS whose rising-and-falling cycle and pulse width are consistent to those of the input signal IS.

Figure 2:
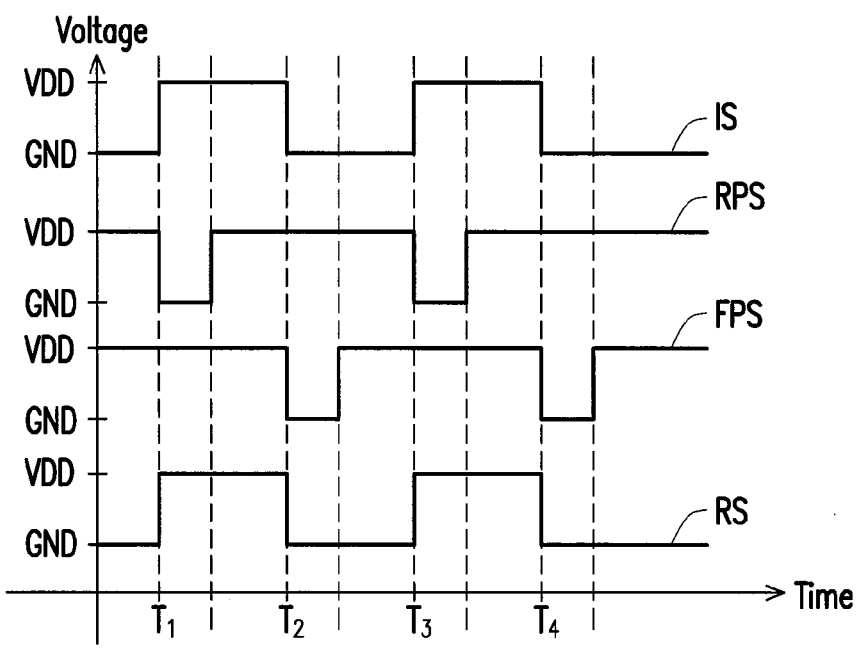
FIG. 2 is a schematic diagram illustrating waveforms of an input signal, a rising pulse signal, a falling pulse signal, and a recovery signal according to an embodiment of the invention.

FIG. 2 is a schematic diagram illustrating waveforms of an input signal, a rising pulse signal, a falling pulse signal, and a recovery signal according to an embodiment of the invention. Particularly, in the present embodiment, a ground voltage GND is defined to be at a logic low level, and an operating voltage VDD (e.g., 1.8V) is defined to be at a logic high level.

With reference to FIG. 2, the rising pulse signal RPS corresponds to rising edges of the input signal IS, and the falling pulse signal FPS corresponds to falling edges of the input signal IS. Specifically, in the present embodiment, the low level of the rising pulse signal RPS corresponds to the rising edges of the input signal IS, and the low level of the falling pulse signal FPS corresponds to the falling edges of the input signal IS. According to the low level of the rising pulse signal RPS and the low level of the falling pulse signal FPS, the reception module 113 may recover the input signal IS by generating the recovery signal RS, for instance. For instance, at the timing T1 and T3, the rising pulse signal RPS is at the low level, and the edge of the recovery signal RS is raised to be at the logic high level; at the timing T2 and T4, the falling pulse signal FPS is at the low level, and the edge of the recovery signal RS is pulled down to be at the logic low level. Except for said conditions, the recovery signal RS is constantly at the same voltage level if the rising pulse signal RPS and the falling pulse signal FPS are at the high levels.

Figure 3:
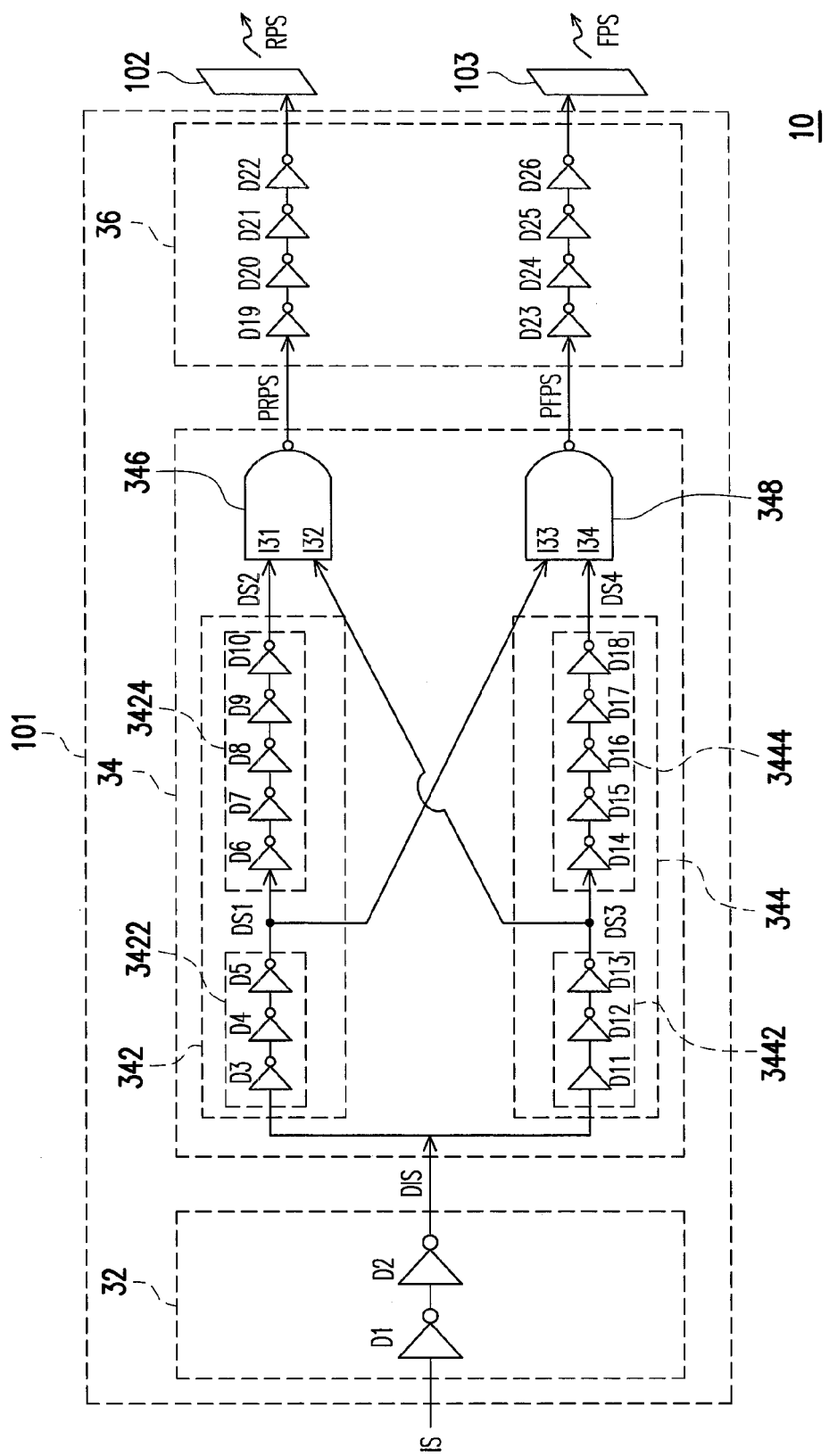
FIG. 3 is a schematic diagram illustrating a transmission module according to an embodiment of the invention.

To elaborate the circuitry of the transmission module 101, please refer to FIG. 3 which is a schematic diagram illustrating a transmission module according to an embodiment of the invention.

As shown in FIG. 3, the transmission module 101 includes a transmission buffer circuit 32, a double edge triggered circuit 34, and a transmission buffer circuit 36. The transmission buffer circuit 32 is configured to receive the input signal IS and output a delay input signal DIS. In the present embodiment, the transmission buffer circuit 32 includes delay units D1 and D2.

The double edge triggered circuit 34 is coupled to the transmission buffer circuit 32. Besides, the double edge triggered circuit 34 is configured to receive the delay input signal DIS and output a pre-rising pulse signal PRPS and a pre-falling pulse signal PFPS. In the present embodiment, the double edge triggered circuit 34 includes delay lines 342 and 344 and NAND gate units 346 and 348.

The delay line 342 is configured to receive the delay input signal DIS and output delay signals DS1 and DS2. A phase of the delay signal DS2 lags behind a phase of the delay signal DS1. The delay line 342, for instance, includes delay units D3 to D10. The delay signal DS1 is generated after the delay input signal DIS is delayed by the delay units D3 to D5, and the delay signal DS2 is generated after the delay signal DS1 is delayed by the delay units D6 to D10, for instance.

To be specific, the delay line 342 includes a pre-delay unit set 3422 and a post-delay unit set 3424. The pre-delay unit set 3422 includes the delay units D3 to D5, and the post-delay unit set 3424 includes the delay units D6 to D10.

An input terminal of the pre-delay unit set 3422 is coupled to the transmission buffer circuit 32, so as to receive the delay input signal DIS from the transmission buffer circuit 32. An output terminal of the pre-delay unit set 3422 is coupled to an input terminal 133 of the NAND gate unit 348, so as to output the delay signal DS1 to the NAND gate unit 348.

An input terminal of the post-delay unit set 3424 is coupled to the output terminal of the pre-delay unit set 3422, so as to receive the delay signal DS1 from the pre-delay unit set 3422. An output terminal of the post-delay unit set 3424 is coupled to an input terminal 131 of the NAND gate unit 346, so as to output the delay signal DS2 to the NAND gate unit 346.

The delay line 344 is configured to receive the delay input signal DIS and output delay signals DS3 and DS4. A phase of the delay signal DS4 lags behind a phase of the delay signal DS3. The delay line 344, for instance, includes delay units D11 to D18. The delay signal DS3 is generated after the delay input signal DIS is delayed by the delay units D11 to D13, and the delay signal DS4 is generated after the delay signal DS3 is delayed by the delay units D14 to D18, for instance.

To be specific, the delay line 344 includes a pre-delay unit set 3442 and a post-delay unit set 3444. The pre-delay unit set 3442 includes the delay units D11 to D13, and the post-delay unit set 3444 includes the delay units D14 to D18.

An input terminal of the pre-delay unit set 3442 is coupled to the transmission buffer circuit 32, so as to receive the delay input signal DIS from the transmission buffer circuit 32. An output terminal of the pre-delay unit set 3442 is coupled to an input terminal 132 of the NAND gate unit 346, so as to output the delay signal DS3 to the NAND gate unit 346.

An input terminal of the post-delay unit set 3444 is coupled to the output terminal of the pre-delay unit set 3442, so as to receive the delay signal DS3 from the pre-delay unit set 3442. An output terminal of the post-delay unit set 3444 is coupled to an input terminal 134 of the NAND gate unit 348, so as to output the delay signal DS4 to the NAND gate unit 348.

The NAND gate unit 346 is configured to receive the delay signals DS2 and DS3 and generate the pre-rising pulse signal PRPS according to the delay signals DS2 and DS3. The NAND gate unit 348 is configured to receive the delay signals DS1 and DS4 and generate the pre-falling pulse signal PFPS according to the delay signals DS1 and DS4.

The transmission buffer circuit 36 is coupled to the double edge triggered circuit 34. In the present embodiment, the transmission buffer circuit 36 includes delay units D19 to D26. Besides, the transmission buffer circuit 36 is configured to receive the pre-rising pulse signal PRPS and the pre-falling pulse signal PFPS. The transmission buffer circuit 36 may delay the pre-rising pulse signal PRPS and amplify the load of the pre-rising pulse signal PRPS by means of the delay units D19 to D22; besides, the transmission buffer circuit 36 outputs the rising pulse signal RPS to the transmission unit 102. The transmission buffer circuit 36 may also delay the pre-falling pulse signal PFPS and amplify the load of the pre-falling pulse signal PFPS by means of the delay units D23 to D26; besides, the transmission buffer circuit 36 outputs the falling pulse signal FPS to the transmission unit 103.

In the present embodiment, each of the delay units may be an inverting delay unit or a non-inverting delay unit. The inverting delay unit may include a complementary metal-oxide-semiconductor (CMOS) inverter or any other delay device characterized by phase inversion, and the non-inverting delay unit may include a transmission gate or any other delay device which is not equipped with the phase inversion characteristics.

In the present embodiment, the number of the inverting delay units in the pre-delay unit set 3422, the post-delay unit set 3424, and the post-delay unit set 3424 are limited to odd numbers, while the number of the inverting delay units in the transmission buffer circuit 32, the pre-delay unit set 3442, and the transmission buffer circuit 32 are limited to even numbers. Besides, the number of the delay units in the delay line 342 should be equal to that in the delay line 344. In particular, the number of the delay units in the pre-delay unit set 3422 should be equal to that in the pre-delay unit set 3442, and the number of the delay units in the post-delay unit set 3424 should be equal to that in the post-delay unit set 3444. That is, in the present embodiment, the delay units D1, D2, D3 to D10, and D14 to D26 are all inverting delay units. However, since one of the delay units D11 to D13 is the non-inverting delay unit, the delay unit D11 may be exemplarily implemented in form of the non-inverting delay unit, while the delay units D12 and D13 may be implemented in form of the inverting delay units.

Figure 4:
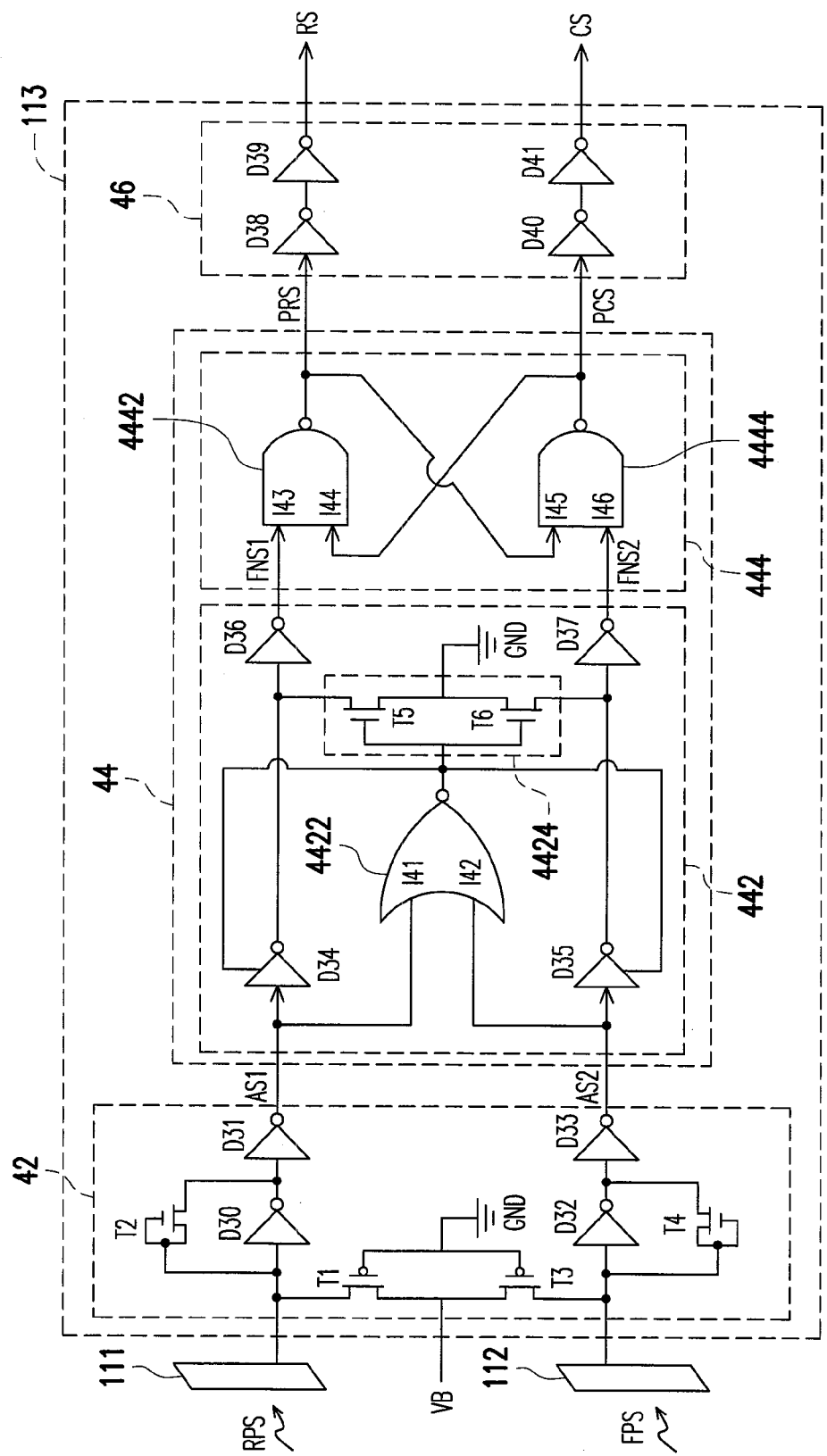
FIG. 4 is a schematic diagram illustrating a reception module according to an embodiment of the invention.

To elaborate the circuitry of the transmission module 113, please refer to FIG. 4 which is a schematic diagram illustrating a reception module according to an embodiment of the invention. With reference to FIG. 4, the reception module 113 includes an amplification circuit 42, a signal recovery circuit 44, and a reception buffer circuit 46. Due to the AC-coupling transmission, the rising pulse signal RPS and the falling pulse signal FPS may be attenuated after being received by the reception units 111 and 112, and thus the amplification circuit 42 is configured to amplify the received rising pulse signal RPS and the received falling pulse signal FPS.

Specifically, the amplification circuit 42 is configured to receive the rising pulse signal RPS and the falling pulse signal FPS, and the amplification circuit 42 may act as a transimpedance amplifier and generate an amplification signal AS1 and an amplification signal AS2. In the present embodiment, the amplification circuit 42 includes amplification units D30 to D33 and transistors T1 to T4. For instance, the amplification units D30 to D33 are inverting amplifiers (e.g., CMOS inverters), and the transistors T1 to T4 are metal-oxide-semiconductor field-effect transistors (MOSFETs). The transistors T1 and T3 may serve as bias control points according to the control bias VB, and the transistors T2 and T4 may act as equivalent resistors. The amplification units D30 and D31 and the transistors T1 and T2 are configured to delay and amplify the rising pulse signal RPS received by the reception unit 111 and output the amplification signal AS1. The amplification units D32 and D33 and the transistors T3 and T4 are configured to delay and amplify the falling pulse signal FPS received by the reception unit 112 and output the amplification signal AS2.

The signal recovery circuit 44 is coupled to the amplification circuit 42. Besides, the signal recovery circuit 44 is configured to receive the amplification signals AS1 and AS2 and output a pre-recovery signal PRS and a pre-inspection signal PCS. Although the amplification signals AS1 and AS2 have undergone the delaying and amplification processes, it should be mentioned that the corresponding waveform relationship between the amplification signals AS1 and AS2 and the input signal IS is not terminated. Accordingly, the pre-recovery signal PRS generated by the signal recovery circuit 44 reflects the rising and falling cycle and the pulse width of the input signal IS.

In addition, before the signal is recovered, the signal recovery circuit 44 may de-noise the signal, so as to filter out the noise generated during signal transmission or signal amplification. Hence, in the present embodiment, the signal recovery circuit 44 includes a de-noise circuit 442 and a set-reset (SR) latch circuit 444.

The de-noise circuit 442 is configured to receive the amplification signals AS1 and AS2 and output a de-noise signal FNS1 and a de-noise signal FNS2. Particularly, falling edges of the amplification signal AS1 correspond to the rising edges of the input signal IS, and falling edges of the amplification signal AS2 correspond to the falling edges of the input signal IS. Therefore, the amplification signals AS 1 and AS2 should not have the logic low level simultaneously. In view of the above, the de-noise circuit 442 serves to preclude the amplification signals AS 1 and AS2 from simultaneously having the logic low level. That is, if both the amplification signals AS 1 and AS2 have the logic low level, the de-noise circuit 442 outputs the logic high de-noise signal FNS 1 and the logic high de-noise signal FNS2.

That is why the de-noise circuit 442 described in the present embodiment includes delay units D34 to D37, an NOR gate unit 4422, and a switch unit 4424 The delay units D34 to D36 are all inverting delay units, and each of the delay units D34 and D35 has a control terminal that receives a control signal. According to the control signal, it is determined whether the delay units D34 and D35 are switched on or off. An input terminal of the delay unit D34 is coupled to the amplification circuit 42, so as to receive the amplification signal AS1 from the amplification circuit 42. An input terminal of the delay unit D35 is coupled to the amplification circuit 42, so as to receive the amplification signal AS2 from the amplification circuit 42. An input terminal of the delay unit D36 is coupled to an output terminal of the delay unit D34, and an output terminal of the delay unit D36 is coupled to the SR latch circuit 444, so as to output the de-noise signal FNS 1 to the SR latch circuit 444. An input terminal of the delay unit D37 is coupled to an output terminal of the delay unit D35, and an output terminal of the delay unit D37 is coupled to the SR latch circuit 444, so as to output the de-noise signal FNS2 to the SR latch circuit 444.

An input terminal 141 of the NOR gate unit 4422 is coupled to an output terminal of the delay unit D31, so as to receive the amplification signal AS 1. An input terminal 142 of the NOR gate unit 4422 is coupled to an output terminal of the delay unit D33, so as to receive the amplification signal AS2. An output terminal of the NOR gate unit 4422 is coupled to a control terminal of the delay unit D34 and a control terminal of the delay unit D35, so as to transmit the control signal (the output of the NOR unit 4422) to the control terminals of the delay units D34 and D35.

The switch unit 4424 includes transistors T5 and T6, both of which are MOSFETs. Besides, the switch unit 4424 is coupled to the output terminal of the NOR gate unit 4422, the input terminal of the delay unit D36, and the input terminal of the delay unit D37. When the amplification signals AS1 and AS2 both have the logic low level, the output of the NOR gate unit 4422 has the logic high level, such that the delay units D34 and D35 are switched off in response to the output of the NOR gate unit 4422, and that the switch unit 4424 responds to the output of the NOR gate unit 4422 and supplies the logic low level to the input terminal of the delay unit D36 and the input terminal of the delay unit D37. In the event that the input of the delay unit D36 and the input of the delay unit D37 are both have the logic low level, the output of the delay unit D36 and the output of the delay unit D37 both have the logic high level through phase inversion. As such, the de-noise signals FNS1 and FNS2 do not simultaneously have the logic low level.

The SR latch circuit 444 is coupled to the de-noise circuit 442. Besides, the SR latch circuit 444 is configured to receive the de-noise signals FNS1 and FNS2 and output the pre-recovery signal PRS. For instance, the SR latch circuit 444 may include an NAND gate unit 4442 and an NAND gate unit 4444.

An input terminal 143 of the NAND gate unit 4442 is coupled to an output terminal of the delay unit D36, so as to receive the de-noise signal FNS1. An input terminal 144 of the NAND gate unit 4442 is coupled to an output terminal of the NAND gate 4444. An input terminal 145 of the NAND gate unit 4444 is coupled to an output terminal of the NAND gate 4442. An input terminal 146 of the NAND gate unit 4444 is coupled to an output terminal of the delay unit D37, so as to receive the de-noise signal FNS2. The NAND gate unit 4442 may output the pre-recovery signal PRS in response to the de-noise signal FNS1 and the output of the NAND gate unit 4444. The NAND gate unit 4444 may output the pre-inspection signal PCS in response to the de-noise signal FNS2 and the output of the NAND gate unit 4442.

The reception buffer circuit 46 is coupled to the signal recovery circuit 44. Besides, the reception buffer circuit 46 is configured to receive the pre-recovery signal PRS and the pre-inspection signal PCS and output the recovery signal RS and an inspection signal CS. In the present embodiment, the reception buffer circuit 46 includes delay units D38 to D41 which are all inverting delay units. The reception buffer circuit 46 may amplify the load of the pre-recovery signal PRS through the delay units D38 and D39 and then output the recovery signal RS, and the reception buffer circuit 46 may also amplify the load of the pre-inspection signal PCS through the delay units D40 and D41 and then output the inspection signal CS. Here, the inspection signal CS may be applied to verify the recovery signal RS.

Figure 5:
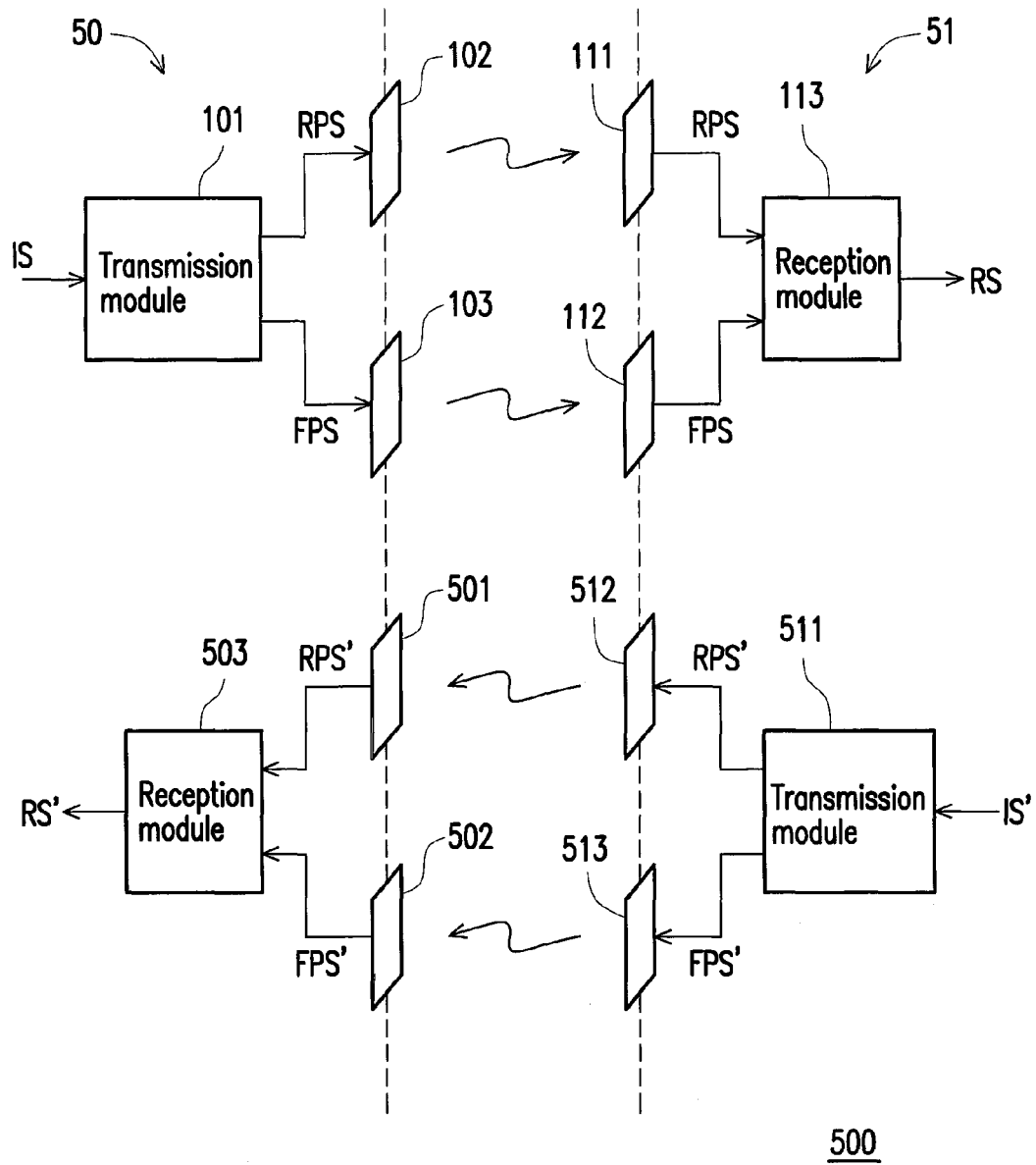
FIG. 5 is a schematic diagram illustrating a signal transmission system according to another embodiment of the invention.

FIG. 5 is a schematic diagram illustrating a signal transmission system according to another embodiment of the invention. With reference to FIG. 5, the signal transmission system 500 includes a chip 50 and a chip 51 that are opposite to each other. The chip 50 includes the transmission module 101, the transmission units 102 and 103, reception units 501 and 502, and a reception module 503. The chip 51 includes a transmission module 511, transmission units 512 and 513, the reception units 111 and 112, and the reception module 113. Here, the devices in FIG. 5 and the devices in FIG. 1 having the same reference numbers (i.e., the transmission module 101, the transmission units 102 and 103, the reception units 111 and 112, and the reception module 113) are substantially the same and thus will not be further described herein.

The transmission module 511 may receive an input signal IS' and generate a rising pulse signal RPS' and a falling pulse signal FPS'. Through the transmission units 512 and 513, the transmission module 511 is able to couple the rising pulse signal RPS' and the falling pulse signal FPS' to the reception units 501 and 502. According to the rising pulse signal RPS' and the falling pulse signal FPS' received by the reception units 501 and 502, the reception module 503 may generate a recovery signal RS'.

Here, the reception units 501 and 502 are identical or similar to the reception units 111 and 112 depicted in FIG. 1 and may be configured on a surface of the chip 50. The transmission units 512 and 513 are identical or similar to the transmission units 102 and 112 depicted in FIG. 1 and may be configured on a surface of the chip 51 corresponding to the reception units 501 and 502. The transmission module 511 is identical or similar to the transmission module 101 depicted in FIG. 1, and the reception module 503 is identical or similar to the reception module 113 depicted in FIG. 1. Hence, no further description is provided herein.

To sum up, the signal transmission system and the signal transmission circuit described herein allow coupling signal transmission between or among at least two chips. Particularly, the to-be-transmitted signal is divided into the rising pulse signal carrying information of rising edges of the to-be-transmitted signal and the falling pulse signal carrying information of falling edges of the to-be-transmitted signal. After the reception end receives the two signals, the information of rising edges of the to-be-transmitted signal and the information of falling edges of the to-be-transmitted signal may be analyzed, so as to accurately reconstruct the to-be-transmitted signal. Moreover, the pulse width of the rising pulse signal and the pulse width of the falling pulse signal are of little importance and hence are reduced as much as possible before phase inversion. As such, the signal recovery accuracy may be guaranteed.

It will be apparent to those skilled in the art that various modifications and variations can be made to the structure of the disclosed embodiments without departing from the scope or spirit of the invention. In view of the foregoing, it is intended that the invention cover modifications and variations of this invention provided they fall within the scope of the following claims and their equivalents.

What is claimed is:

1. A signal transmission system comprising:
    a first chip comprising:
    a transmission module configured to receive an input signal and generate a rising pulse signal and a falling pulse signal in response to a waveform of the input signal, wherein the rising pulse signal corresponds to rising edges of the input signal, and the falling pulse signal corresponds to falling edges of the input signal;
    a first transmission unit coupled to the transmission module, located on a surface of the first chip, and configured to transmit the rising pulse signal; and
    a second transmission unit coupled to the transmission module, located on the surface of the first chip, and configured to transmit the falling pulse signal; and
    a second chip configured opposite to the first chip, the second chip comprising:
    a first reception unit located on a surface of the second chip, the first reception unit corresponding to the first transmission unit and being configured to receive the rising pulse signal;
    a second reception unit located on the surface of the second chip, the second reception unit corresponding to the second transmission unit and being configured to receive the falling pulse signal; and
    a reception module coupled to the first reception unit and the second reception unit and configured to output a recovery signal according to the rising pulse signal and the falling pulse signal.

2. The signal transmission system as recited in claim 1, wherein the transmission module comprises:
    a first transmission buffer circuit configured to receive the input signal and output a delay input signal;
    a double edge triggered circuit coupled to the first transmission buffer circuit, the double edge triggered circuit comprising:
    a first delay line configured to receive the delay input signal and output a first delay signal and a second delay signal, wherein a phase of the second delay signal lags behind a phase of the first delay signal;
    a second delay line configured to receive the delay input signal and output a third delay signal and a fourth delay signal, wherein a phase of the fourth delay signal lags behind a phase of the third delay signal;
    a first NAND gate unit configured to receive the second delay signal and the third delay signal and generate a pre-rising pulse signal according to the second delay signal and the third delay signal; and
    a second NAND gate unit configured to receive the first delay signal and the fourth delay signal and generate a pre-falling pulse signal according to the first delay signal and the fourth delay signal; and
    a second transmission buffer circuit coupled to the double edge triggered circuit and configured to receive the pre-rising pulse signal and the pre-falling pulse signal, output the rising pulse signal to the first transmission unit, and output the falling pulse signal to the second transmission unit.

3. The signal transmission system as recited in claim 1, wherein the reception module comprises:
    an amplification circuit configured to receive the rising pulse signal and the falling pulse signal and generate a first amplification signal and a second amplification signal;
    a signal recovery circuit coupled to the amplification circuit, the signal recovery circuit comprising:
    a de-noise circuit configured to receive the first amplification signal and the second amplification signal and output a first de-noise signal and a second de-noise signal, wherein when the first amplification signal and the second amplification signal both have a first voltage level, the de-noise circuit outputs the first de-noise signal having a second voltage level and the second de-noise signal having the second voltage level; and
    a set-reset latch circuit coupled to the de-noise circuit and configured to receive the first de-noise signal and the second de-noise signal and output a pre-recovery signal; and
    a reception buffer circuit coupled to the signal recovery circuit and configured to receive the pre-recovery signal and output the recovery signal.

4. The signal transmission system as recited in claim 1, wherein falling edges of the rising pulse signal correspond to the rising edges of the input signal, and falling edges of the falling pulse signal correspond to the falling edges of the input signal.

5. The signal transmission system as recited in claim 2, wherein the first delay line comprises a plurality of first delay units, the second delay line comprises a plurality of second delay units, the number of the first delay units is equal to the number of the second delay units, and one of the second delay units is a non-inverting delay unit.

6. The signal transmission system as recited in claim 2, wherein the first delay line comprises:
    a first pre-delay unit set, an input terminal of the first pre-delay unit set being coupled to the first transmission buffer circuit, so as to receive the delay input signal from the first transmission buffer circuit, an output terminal of the first pre-delay unit set being coupled to a first input terminal of the second NAND gate unit, so as to output the first delay signal to the second NAND gate unit; and
    a first post-delay unit set, an input terminal of the first post-delay unit set being coupled to the output terminal of the first pre-delay unit set, so as to receive the first delay signal from the first pre-delay unit set, an output terminal of the first post-delay unit set being coupled to a first input terminal of the first NAND gate unit, so as to output the second delay signal to the first NAND gate unit, wherein the second delay line comprises:
  a second pre-delay unit set, an input terminal of the second pre-delay unit set being coupled to the first transmission buffer circuit, so as to receive the delay input signal from the first transmission buffer circuit, an output terminal of the second pre-delay unit set being coupled to a second input terminal of the first NAND gate unit, so as to output the third delay signal to the first NAND gate unit; and
  a second post-delay unit set, an input terminal of the second post-delay unit set being coupled to the output terminal of the second pre-delay unit set, so as to receive the third delay signal from the second pre-delay unit set, an output terminal of the second post-delay unit set being coupled to a second input terminal of the second NAND gate unit, so as to output the fourth delay signal to the second NAND gate unit.

7. The signal transmission system as recited in claim 3, wherein the de-noise circuit comprises:
  a first delay unit, an input terminal of the first delay unit being coupled to the amplification circuit, so as to receive the first amplification signal from the amplification circuit;
  a second delay unit, an input terminal of the second delay unit being coupled to the amplification circuit, so as to receive the second amplification signal from the amplification circuit;
  a third delay unit, an input terminal of the third delay unit being coupled to an output terminal of the first delay unit, an output terminal of the third delay unit being coupled to the set-reset latch circuit, so as to output the first de-noise signal to the set-reset latch circuit;
  a fourth delay unit, an input terminal of the fourth delay unit being coupled to an output terminal of the second delay unit, an output terminal of the fourth delay unit being coupled to the set-reset latch circuit, so as to output the second de-noise signal to the set-reset latch circuit;
  an NOR gate unit, a first input terminal of the NOR gate unit being coupled to the amplification circuit, so as to receive the first amplification signal from the amplification circuit, a second input terminal of the NOR gate unit being coupled to the amplification circuit, so as to receive the second amplification signal from the amplification circuit, an output terminal of the NOR gate unit being coupled to a control terminal of the first delay unit and a control terminal of the second delay unit; and
  a switch unit coupled to the output terminal of the NOR gate unit, the input terminal of the third delay unit, and the input terminal of the fourth delay unit, wherein when the first amplification signal and the second amplification signal both have the first voltage level, the switch unit responds to an output of the NOR gate unit and supplies the first voltage level to the input terminal of the third delay unit and the input terminal of the fourth delay unit.

8. The signal transmission system as recited in claim 6, wherein the first pre-delay unit set comprises a plurality of first delay units, the second pre-delay unit set comprises a plurality of second delay units, the number of the first delay units is equal to the number of the second delay units, and one of the second delay units is a non-inverting delay unit.

9. A signal transmission circuit suitable for being configured in a chip, the signal transmission circuit comprising:
  a transmission module configured to receive an input signal and generate a first rising pulse signal and a first falling pulse signal in response to a waveform of the input signal, wherein the first rising pulse signal corresponds to rising edges of the input signal, and the first falling pulse signal corresponds to falling edges of the input signal;
  a first transmission unit coupled to the transmission module, adapted to be set on a surface of the chip, and configured to transmit the first rising pulse signal; and
  a second transmission unit coupled to the transmission module, adapted to be set on the surface of the chip, and configured to transmit the first falling pulse signal.

10. The signal transmission circuit as recited in claim 9, wherein the transmission module comprises:
  a first transmission buffer circuit configured to receive the input signal and output a delay input signal;
  a double edge triggered circuit coupled to the first transmission buffer circuit, the double edge triggered circuit comprising:
    a first delay line configured to receive the delay input signal and output a first delay signal and a second delay signal, wherein a phase of the second delay signal lags behind a phase of the first delay signal;
    a second delay line configured to receive the delay input signal and output a third delay signal and a fourth delay signal, wherein a phase of the fourth delay signal lags behind a phase of the third delay signal;
    a first NAND gate unit configured to receive the second delay signal and the third delay signal and generate a pre-rising pulse signal according to the second delay signal and the third delay signal; and
    a second NAND gate unit configured to receive the first delay signal and the fourth delay signal and generate a pre-falling pulse signal according to the first delay signal and the fourth delay signal; and
  a second transmission buffer circuit coupled to the double edge triggered circuit and configured to receive the pre-rising pulse signal and the pre-falling pulse signal, output the first rising pulse signal to the first transmission unit, and output the first falling pulse signal to the second transmission unit.

11. The signal transmission circuit as recited in claim 9, further comprising:
  a first reception unit adapted to be set on the surface of the chip and configured to receive a second rising pulse signal;
  a second reception unit adapted to be set on the surface of the chip and configured to receive a second falling pulse signal; and
  a reception module coupled to the first reception unit and the second reception unit and configured to output a recovery signal according to the second rising pulse signal and the second falling pulse signal.

12. The signal transmission circuit as recited in claim 9, wherein falling edges of the first rising pulse signal correspond to the rising edges of the input signal, and falling edges of the first falling pulse signal correspond to the falling edges of the input signal.

13. The signal transmission circuit as recited in claim 10, wherein the first delay line comprises a plurality of first delay units, the second delay line comprises a plurality of second delay units, the number of the first delay units is equal to the number of the second delay units, and one of the second delay units is a non-inverting delay unit.

14. The signal transmission circuit as recited in claim 10, wherein the first delay line comprises:
  a first pre-delay unit set, an input terminal of the first pre-delay unit set being coupled to the first transmission buffer circuit, so as to receive the delay input signal from the first transmission buffer circuit, an output terminal of the first pre-delay unit set being coupled to a first input terminal of the second NAND gate unit, so as to output the first delay signal to the second NAND gate unit; and a first post-delay unit set, an input terminal of the first post-delay unit set being coupled to the output terminal of the first pre-delay unit set, so as to receive the first delay signal from the first pre-delay unit set, an output terminal of the first post-delay unit set being coupled to a first input terminal of the first NAND gate unit, so as to output the second delay signal to the first NAND gate unit, wherein the second delay line comprises:

a second pre-delay unit set, an input terminal of the second pre-delay unit set being coupled to the first transmission buffer circuit, so as to receive the delay input signal from the first transmission buffer circuit, an output terminal of the second pre-delay unit set being coupled to a second input terminal of the first NAND gate unit, so as to output the third delay signal to the first NAND gate unit; and a second post-delay unit set, an input terminal of the second post-delay unit set being coupled to the output terminal of the second pre-delay unit set, so as to receive the third delay signal from the second pre-delay unit set, an output terminal of the second post-delay unit set being coupled to a second input terminal of the second NAND gate unit, so as to output the fourth delay signal to the second NAND gate unit.

15. The signal transmission circuit as recited in claim 11, wherein the reception module comprises:

an amplification circuit configured to receive the second rising pulse signal and the second falling pulse signal and generate a first amplification signal and a second amplification signal;

a signal recovery circuit coupled to the amplification circuit, the signal recovery circuit comprising:

a de-noise circuit configured to receive the first amplification signal and the second amplification signal and output a first de-noise signal and a second de-noise signal, wherein when the first amplification signal and the second amplification signal both have a first voltage level, the de-noise circuit outputs the first de-noise signal having a second voltage level and the second de-noise signal having the second voltage level; and a set-reset latch circuit coupled to the de-noise circuit and configured to receive the first de-noise signal and the second de-noise signal and output a pre-recovery signal; and a reception buffer circuit coupled to the signal recovery circuit and configured to receive the pre-recovery signal and output the recovery signal.

16. The signal transmission circuit as recited in claim 14, wherein the first pre-delay unit set comprises a plurality of first delay units, the second pre-delay unit set comprises a plurality of second delay units, the number of the first delay units is equal to the number of the second delay units, and one of the second delay units is a non-inverting delay unit.

17. The signal transmission circuit as recited in claim 15, wherein the de-noise circuit comprises:

a first delay unit, an input terminal of the first delay unit being coupled to the amplification circuit, so as to receive the first amplification signal from the amplification circuit;

a second delay unit, an input terminal of the second delay unit being coupled to the amplification circuit, so as to receive the second amplification signal from the amplification circuit;

a third delay unit, an input terminal of the third delay unit being coupled to an output terminal of the first delay unit, an output terminal of the third delay unit being coupled to the set-reset latch circuit, so as to output the first de-noise signal to the set-reset latch circuit;

a fourth delay unit, an input terminal of the fourth delay unit being coupled to an output terminal of the second delay unit, an output terminal of the fourth delay unit being coupled to the set-reset latch circuit, so as to output the second de-noise signal to the set-reset latch circuit;

an NOR gate unit, a first input terminal of the NOR gate unit being coupled to the amplification circuit, so as to receive the first amplification signal from the amplification circuit, a second input terminal of the NOR gate unit being coupled to the amplification circuit, so as to receive the second amplification signal from the amplification circuit, an output terminal of the NOR gate unit being coupled to a control terminal of the first delay unit and a control terminal of the second delay unit; and a switch unit coupled to the output terminal of the NOR gate unit, the input terminal of the third delay unit, and the input terminal of the fourth delay unit, wherein when the first amplification signal and the second amplification signal both have the first voltage level, the switch unit responds to an output of the NOR gate unit and supplies the first voltage level to the input terminal of the third delay unit and the input terminal of the fourth delay unit.

* * * * *